United States Patent [19]

Wannlund

[11] Patent Number: 5,063,090
[45] Date of Patent: Nov. 5, 1991

[54] LECITHIN AS A WETTABILITY ENHANCING COATING FOR PLASTIC

[75] Inventor: Jon C. Wannlund, San Diego, Calif.
[73] Assignee: Difco Laboratories, Detroit, Mich.
[21] Appl. No.: 548,233
[22] Filed: Jun. 29, 1990
[51] Int. Cl.$^5$ .............................................. B05D 3/02
[52] U.S. Cl. ....................................... 427/384; 427/2; 427/430.1; 427/421; 427/429; 106/244; 422/52; 422/58; 422/68.1
[58] Field of Search .................... 427/2, 8, 384, 393.1, 427/421, 429, 430.1; 422/52, 58, 100, 101, 68.1; 106/244

[56] References Cited

U.S. PATENT DOCUMENTS

| | | | |
|---|---|---|---|
| 2,997,398 | 8/1961 | Kronstein et al. | 106/14.36 |
| 3,661,605 | 5/1972 | Rubin et al. | 106/244 |
| 3,676,391 | 7/1972 | De Ross | 525/222 |
| 3,821,007 | 6/1974 | Carey | 106/150 |
| 4,023,912 | 5/1977 | Mahler et al. | 106/244 |
| 4,195,009 | 3/1980 | Zimmerman | 523/218 |
| 4,207,347 | 6/1980 | D'Atri et al. | 426/92 |
| 4,371,451 | 2/1983 | Scotti et al. | 106/244 |
| 4,806,316 | 2/1989 | Johnson et al. | 422/58 |

OTHER PUBLICATIONS

Joseph Eichberg, *Kirk-Othmer Encyclopedia of Chemical Technlology,* Third Edition, vol. 14, pp. 250-269, 1981.
The Merck Index, Ninth Edition (1976), entry 5287 (Lecithin).

*Primary Examiner*—Michael Lusignan
*Assistant Examiner*—D. L. Dudash
*Attorney, Agent, or Firm*—Gregory O. Garmong

[57] ABSTRACT

Lecithin is coated onto the surface of plastics such as polystyrene and polyethylene to enhance the wettability of aqueous liquids to the plastic. In one application, plastic test wells are coated with lecithin to enhance the ability of liquids placed into a well with sloping sides to flow in a regular manner into a well with vertical sides. The lecithin is applied to the plastic by dissolving the lecithin in an organic solvent such as heptane, coating the solution onto the plastic surface, and evaporating the solvent.

19 Claims, 1 Drawing Sheet

LECITHIN AS A WETTABILITY ENHANCING COATING FOR PLASTIC

BACKGROUND OF THE INVENTION

This invention relates to coatings for plastics, and, more particularly, to a wettability enhancing coating for plastics.

In several types of chemical and medical test procedures, a liquid such as a body fluid must be reacted with individual reactants in a sequence of related but separate chemical reactions, and then the final product analyzed. Traditionally, such procedures have been performed by placing the fluid into a reaction tube or the like, adding the remaining reactants for the first reaction, and permitting the first reaction to proceed to completion. The further reactants for the second reaction are added, and the second reaction is permitted to proceed to completion. This stepwise operation can be repeated as many times as necessary, until a final reaction product is obtained for analysis. This technique is not particularly suitable for conducting measurements of reactions such as those that produce measurable light by chemiluminescence, because of the time required to conduct the final mixing and place the reaction tube into a light-measurement apparatus.

In an alternative approach better suited for the measurement of chemiluminescent reactions, a plastic test plate having multichambered test wells has been developed. A liquid test sample is placed into a sample receiving chamber which has a sloping wall, and mixed with reactants previously placed into the first chamber. Then the test plate is tilted so that the mixture flows along the sloping wall of the sample receiving chamber and into a reaction measurement chamber. The reaction measurement chamber is preferably cylindrical in shape with a flat bottom that is pressed against a piece of photographic film. The mixture from the sample receiving chamber mixes with additional reactants and the light-producing reaction occurs if the original test sample contained a chemical under test. The intensity of any resulting light is measured through the transparent flat bottom of the reaction measurement chamber.

In practice, it has been found that typical aqueous solutions such as a mixture of urine test fluid and the reactants in the sample receiving chamber do not readily flow along the sloping wall of the sample receiving chamber. The aqueous mixture does not wet the sloping plastic wall, and has a tendency to bead and not flow. Since the test plate is normally inside a measurement apparatus with opaque walls when the procedures are performed, the failure of the aqueous liquid to flow from the sample receiving chamber to the reaction measurement chamber may not be detected. The result is an apparent negative result, since no light output would be measured. Where the test sample actually contained the reactant under study, the test results would be incorrect. Thus, a potentially injurious condition in the subject who provided the test sample might go undetected.

There is therefore a need for an approach for improving the flowability of an aqueous liquid test sample along a plastic surface. Some such approaches are known, including the proprietary Sigmacoat ® hydrophobic coating and Dow gas treatment, and the corona discharge procedure. The latter is widely used, but requires expensive apparatus. A better approach is needed. The present invention fulfills this need, and further provides related advantages.

SUMMARY OF THE INVENTION

The present invention provides a convenient coating procedure for enhancing the flowability of an aqueous liquid over plastics, using a readily available chemical in a new manner. The coating is simply applied, using conventional laboratory apparatus that is inexpensive and widely available. The flowability of an aqueous liquid is improved by increasing the wettability of the liquid to the plastic.

In accordance with the invention, an apparatus having a contact surface treated for enhanced wettability by aqueous liquids comprises a piece of plastic having a contact surface; and a coating of lecithin on the contact surface.

The lecithin is preferably applied by dissolving it into a solvent, such as the organic liquid heptane, which dissolves the lecithin and also does not attack, dissolve, or fog the plastic. In a preferred embodiment, the lecithin is dissolved in the heptane in a concentration of from about 0.2 to about 200 milligrams of lecithin per milliliter of heptane. The solution is then coated onto the plastic, as by dipping, spraying, or brushing. The solvent is evaporated, leaving the thin lecithin coating. A wide variety of plastics, including the popular polystyrene and polyethylene, can have their flowability and wettability of aqueous liquids thereon enhanced.

This coating is readily applied in a variety of circumstances, to articles of various shapes and configurations. The coating thickness and technique are not critical, and good wettability is achieved over a broad range of application conditions. The lecithin and typical solvents are inexpensive, as is the coating apparatus. Other features and advantages of the invention will be apparent from the following more detailed description of the preferred embodiment, taken in conjunction with the accompanying drawing, which illustrates, by way of example, the principles of the invention.

DETAILED DESCRIPTION OF THE PREFERRED EMBODIMENT

Figure 1:
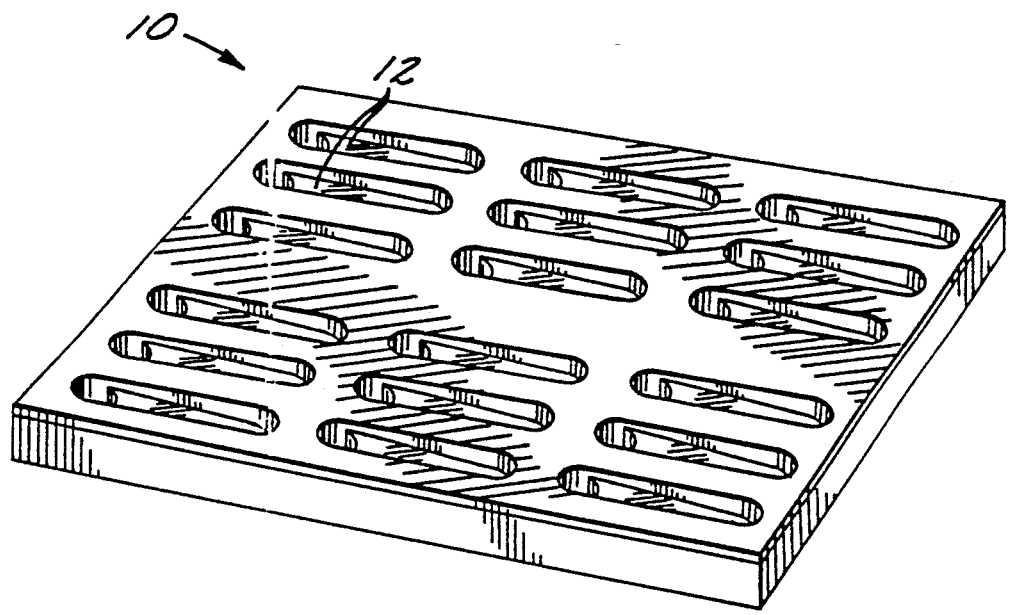
FIG. 1 is a perspective view of a test plate.
Figure 2:
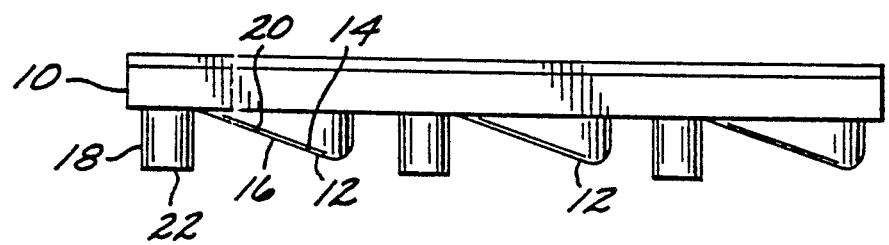
FIG. 2 is a side elevational view of the test plate of FIG. 1.

FIGS. 1 and 2 illustrate a test plate 10 having a plurality of test wells 12 therein. The presently preferred use of the invention is in conjunction with such as test plate 10, although it is not so limited. The present invention is widely applicable to the enhancement of wettability in many different configurations of plastic articles.

An illustrative test well 12 includes a sample receiving chamber 14 extending downwardly from the test plate 10. The sample receiving chamber 14 has on one side an upwardly sloping interior wall 16 that slopes upwardly and outwardly from the bottom of the chamber 14. A reaction measurement chamber 18 is positioned adjacent the sample receiving chamber 14, near a top end 20 of the upwardly sloping interior wall 16. The reaction measurement chamber 18 is illustrated as a generally cylindrical cup with an open top and a transparent, closed, flat bottom 22.

In the use of the test plate 10, an aqueous liquid specimen such as urine is place into the sample receiving chamber 14 and reacted with a first reactant previously placed into the chamber 14. When sufficient time has passed for the first reaction to be as complete as required, then one end of the test plate 10 (in the illustration of FIG. 1 the right end) is displaced upwardly so that the test plate 10 is rotated (counterclockwise in FIG. 1). The reacted liquid specimen in the sample receiving chamber 14 flows along the sloping interior wall 16 and thence into the reaction measurement chamber 18, where it reacts with a second reactant.

In one preferred application of the test plate 10, the present invention is used in conjunction with an analysis of the bacteriuria content of urine samples. This test depends upon the reaction of bacterial adenosine triphosphate (ATP) with luminescent reagents, to produce light that is measured through the bottom 22 of the test well 12. There are two sources of ATP in a urine sample, bacterial and non-bacterial sources. The objective of the bacteriuria test is to measure bacterial sources only. In the test, the ATP in non-bacterial sources is first removed so that it cannot adversely affect the test results, and then the ATP in bacterial sources is released and reacted with the luminescent reagents.

In this test procedure, the sample receiving chamber 14 contains a release reactant to lyse somatic cells, releasing non-bacterial ATP therefrom. The release reactant does not affect the bacterial ATP, which remains bound to the bacteria. The release reactant is TRITON®X100 detergent (polyoxyethylene ether). The sample receiving chamber 14 also contains an enzyme elimination reactant to dephosphorolate the non-bacterial ATP to adenosene monophosphate, also known as AMP, which is not measured by the subsequent luminescent assay. The preferred elimination reactant is apyrase enzyme.

To prepare the reagent used in the sample receiving chamber 14, about 0.16 units of solid apyrase enzyme and about 100 microliters of 0.2 percent aqueous solution of TRITON®X100 detergent liquid are mixed with 0.5 milligrams of bovine serum albumin. This mixture is added to the sample receiving chamber 14 and freeze dried.

In the reaction measurement chamber 18, the bacterial ATP is released, and reacted with luminescent reagents. The result is light produced in proportion to the bacterial ATP, with the amount of light measured indicating the amount of bacterial ATP present in the urine specimen. To prepare the solid material for the reaction measurement chamber 18, the following ingredients are mixed together: about 100 microliters of a 0.005 percent to 0.6 percent concentration aqueous solution of a chemical bacterial releasing agent (such as polyoxyethylene ether, hexachlorophene, chlorohexadine, or dimethysulfoxide), about 10 to 100 micrograms of firefly luciferase enzyme, about 15 micrograms of solid D-luciferin, about 10 microliters of a 10 millimolar magnesium chloride luminescent cofactor, about 0.5 milligrams of bovine serum albumin, and a N-2-Hydroxyethylpiperadine- N'-2-ethanesulfonic acid buffer to bring the pH of the solution to 7.75. The solution is added to the reaction measurement chamber 18 and freeze dried.

From the following description of the preferred application of the invention with the test plate 10, it will be apparent that a critical step is the smooth flowing of the test sample along the sloping wall 16 when the test plate 10 is rotated. If the test sample does not flow from the chamber 14 into the chamber 18, no potential reactants will reach the reaction measurement chamber 18, and the test will fail even if it should have produced a positive result.

It is desirable to manufacture the test plate from a plastic material that is inexpensive and readily molded as by injection molding. Polystyrene and polyethylene are exemplary candidate materials. When a test plate 10 is manufactured from either of these materials, loaded with the reactants previously described, provided with a urine test sample, and operated as previously described, it is observed that in many cases the urine does not wet the interior of the sample receiving chamber 14, and does not flow smoothly along the sloping wall 16 from the sample receiving chamber 14 to the reaction measurement chamber 18, when the test plate is rotated.

In accordance with a processing aspect of the invention, a process for preparing a reaction test apparatus treated for enhanced wettability comprises the steps of furnishing an untreated reaction test apparatus having a preselected form; applying to the surface of the piece of reaction test apparatus a solution of lecithin in a solvent; and evaporating the solvent.

The present invention provides for coating the upper surface of the test plate 10, which is to be contacted by the test sample, with lecithin. Lecithin is a chemical known for other uses, and is described in detail in entry 5287 of the Merck Index, Eighth Edition, which is incorporated by reference. Lecithin is also known as phosphatidycholine, lecithol, vitellin, kelecin, and granulestin, and is a phosphatide found in all living organisms. It is a mixture of the diglycerides of stearic, palmitic, and oleic acids, linked to the choline ester of phosphoric acid. It is commercially available in a form normally manufactured from soybeans. Soybean lecithin contains 11.7 percent palmitic acid, 4.0 percent stearic, 8.6 percent palmitoleic, 9.8 percent oleic, 55.0 percent linoleic, 4.0 percent linolenic, and 5.5 percent $C_{20}$ to $C_{22}$ acids including arachidonic. Other aspects of lecithin are reported in U.S. Pat. No. 2,931,818, whose disclosure is incorporated by reference.

Soybean lecithin is readily available in specialty food stores. To use it for enhancing flowability and wettability, commercially purchased lecithin is dissolved in the organic solvent heptane, in an amount of from about 0.2 to about 200 milligrams of lecithin per milliliter of heptane, at ambient temperature. If a substantially lower concentration is used, the coating typically dissolves into the test solution that is placed into the test well, and becomes ineffective. If a substantially higher concentration is used, the coating tends to be sticky and too heavy for practical use. More preferably, the concentration of lecithin is from about 0.5 to about 100 milligrams per milliliter of heptane. Most preferably, the concentration of lecithin is about 10 milligrams of lecithin per milliliter of heptane, a concentration that has been found to be readily prepared and applied, and give consistently good results. The preferred solution of 10 mg/ml concentration has a viscosity like that of water. These concentration ranges were established by preparing solutions of 0.2 mg/ml (milligram of lecithin per milliliter of heptane) and also from 0.5 to 200 mg/ml, in 0.5 mg/ml increments, applying them to polystyrene pieces, and observing the results.

Heptane is the preferred solvent, as it meets both solvent requirements of dissolving the lecithin and not attacking the plastic. The plastic cannot be dissolved or even fogged, as it must remain fully transparent to the light emitted in the luminescence testing. Other common solvents such as toluene, hexane, and benzene tend to fog the plastic, and were not used for this reason. In other utilizations of the invention where light transparency is not critical, such solvents can be used.

To practice the preferred approach of the invention, a plastic test plate 10 was coated on each surface to be contacted by the liquid test sample, with the 10 mg/ml solution of lecithin in heptane. Coating may be by any procedure such as dipping, spraying, or brushing. Most preferably, coating was by dipping, and any excess solution was drained off. There was no attempt to coat only certain areas of the test plate, because the lecithin and solvent are relatively inexpensive, and selective coating would cost more than the savings in material would justify. A number of coating tests were done, and there was no apparent difference in performance of the coated test plates related to coating thickness or concentration.

After coating the test plate with the solution, the test plate is held at ambient or slightly elevated temperature, preferably 70°-80° F., to evaporate the heptane solvent. The test plate is clear and transparent upon completion of the coating and evaporation operation, and the lecithin is not visible to the eye on the surface of the plastic.

The resulting test plate was then loaded with the reactants for the sample receiving chamber and the reaction measurement chamber, as described previously. The lecithin coating survived through the loading procedures.

The following examples are intended to illustrate aspects of the invention, and should not be taken as limiting of the invention in any respect.

EXAMPLE 1

A number of the test plates of the form illustrated in FIG. 1 was made of polystyrene. The specific polystyrene used for this Example 1 was DOW STYRON® polystyrene resin type 666 D. The test plates were treated and coated by dipping into a solution of 10 milligrams of lecithin in one milliliter of heptane, at ambient temperature. The heptane was evaporated in a warm air stream at 75° F.

The treated test plates and untreated but otherwise identical test plates were loaded with the amounts of the reactants discussed previously.

EXAMPLE 2

A number of the treated and untreated test plates of Example 1 were comparatively tested for liquid wettability and flowability. In each test, a droplet of urine was placed into the sample receiving chamber of each test plate. The droplet would not flow along the sloping wall of the uncoated sample receiving chamber, but readily flowed along the sloping wall of the coated sample receiving chamber, when each test plate was rotated from the horizontal by about 30 degrees. This is the intended rotation in the contemplated testing procedure. Had the untreated test plate been used in an actual test procedure where the urine sample contained bacteriuria, there would have been no light emitted due to the failure of the test sample to flow into the reaction measurement chamber, an incorrect result.

EXAMPLE 3

Samples of treated and untreated test plates prepared as in Example 1 were stored for a period of 11 months at ambient temperature. The test of Example 2 was repeated, with the same results. The lecithin coating remains effective to enhance flowability and wettability for extended storage periods.

EXAMPLE 4

Treated and untreated test plates prepared as in Example 1 were comparatively tested with droplets of urine containing a known concentration of bacteriuria. The volume of the urine droplet for the untreated test plates was 200 microliters, while the volume of the urine droplet for the treated test plates was 100 microliters. The larger volume of the droplet for the untreated test plates was necessary because, even with tilting the test plate to a high angle to attempt to obtain flow, only about ½ of the sample actually flowed into the measurement chamber of the test well. Care was taken to ensure that at least part of the test sample in the uncoated test plate did flow into the reaction measurement chamber, by carefully tilting it to a higher angle than desired, and in fact to the vertical. For the treated test plate, the test plate was tilted only to the desired 30 degree angle to induce the flow of the droplet, and substantially all of the sample did flow to the test well. By this approach, substantially equal volumes reached the reaction measurement chamber in each case. The light output in each test was measured and compared. The light outputs were substantially identical, indicating that the presence of lecithin used to enhance wettability and flowability does not adversely affect the test results. The lecithin coating does, however, ensure flow of the droplet and operability of the testing procedure.

The approach of the invention therefore provides an inexpensive approach for ensuring wettability and flowability that is compatible with the testing function of the test plate. The lecithin coating is stable and operable even after extended storage periods. Although a particular embodiment of the invention has been described in detail for purposes of illustration, various modifications may be made without departing from the spirit and scope of the invention. Accordingly, the invention is not to be limited except as by the appended claims.

What is claimed is:

1. A reaction test apparatus having a surface treated for enhanced wettability by aqueous solutions, comprising:
   a piece of plastic; and
   a wettability enhancing coating on the surface of the plastic piece, the coating consisting essentially of lecithin.

2. The apparatus of claim 1, wherein the plastic is polystyrene.

3. The apparatus of claim 1, wherein the plastic is polyethylene.

4. The apparatus of claim 1, wherein the piece of plastic includes at least one test well comprising
   a reaction measurement chamber having a flat transparent bottom, and
   a sloping sample receiving chamber, from which a sample can be moved into the measurement chamber by tipping the piece of plastic.

5. An apparatus having a contact surface treated for enhanced wettability by aqueous liquids, comprising:
   a piece of plastic having a contact surface; and
   a coating of lecithin on the contact surface.

6. The apparatus of claim 5, wherein the apparatus is a reaction test apparatus.

7. The apparatus of claim 6, wherein the reaction test apparatus includes at least one test well comprising a reaction measurement chamber having a flat transparent bottom, and a sloping sample receiving chamber, from which a sample can be moved into the measurement chamber by tipping the piece of plastic.

8. The apparatus of claim 5, wherein the plastic is polystyrene.

9. The apparatus of claim 5, wherein the plastic is polyethylene.

10. A process for preparing a reaction test apparatus treated for enhanced wettability, comprising the steps of:

furnishing an untreated plastic reaction test apparatus having a preselected form;

applying to the surface of the piece of reaction test apparatus a solution of lecithin in a solvent; and evaporating the solvent.

11. The process of claim 10, wherein the solvent is heptane.

12. The process of claim 10, wherein the plastic is polystyrene.

13. The process of claim 10, wherein the plastic is polyethylene.

14. The process of claim 11, wherein the concentration of lecithin in the solvent is from about 0.2 to about 200 milligrams of lecithin per milliliter of solvent.

15. The process of claim 11, wherein the concentration of lecithin is about 10 milligrams per milliliter of solvent.

16. The process of claim 10, wherein the step of applying is accomplished by dipping.

17. The process of claim 10, wherein the step of applying is accomplished by spraying.

18. The process of claim 10, wherein the step of applying is accomplished by brushing.

19. The process of claim 10, wherein the reaction test apparatus comprises a reaction measurement chamber having a flat transparent bottom, and a sloping sample receiving chamber, from which a sample can be moved into the measurement chamber by tipping the piece of plastic.

* * * * *